(12) United States Patent
Choe et al.

(10) Patent No.: US 9,767,769 B2
(45) Date of Patent: Sep. 19, 2017

(54) DISPLAY DEVICE, METHOD OF DRIVING THE SAME, AND IMAGE DISPLAY SYSTEM INCLUDING THE SAME

(71) Applicant: Samsung Display Co., Ltd., Yongin, Gyeonggi-Do (KR)

(72) Inventors: Weon-Jun Choe, Yongin (KR); Joon-Chul Goh, Yongin (KR); Yun-Ki Baek, Yongin (KR); Hae-Kwan Seo, Yongin (KR); Myeong-Su Kim, Yongin (KR); Jae-Wan Park, Yongin (KR)

(73) Assignee: Samsung Display Co., Ltd. (KR)

( * ) Notice: Subject to any disclaimer, the term of this patent is extended or adjusted under 35 U.S.C. 154(b) by 187 days.

(21) Appl. No.: 14/632,878

(22) Filed: Feb. 26, 2015

(65) Prior Publication Data

US 2015/0301580 A1     Oct. 22, 2015

(30) Foreign Application Priority Data

Apr. 21, 2014     (KR) .......................... 10-2014-0047630

(51) Int. Cl.
*G09G 5/377* (2006.01)
*G06F 3/041* (2006.01)
(Continued)

(52) U.S. Cl.
CPC ........... *G09G 5/377* (2013.01); *G06F 1/3206* (2013.01); *G06F 1/3265* (2013.01);
(Continued)

(58) Field of Classification Search
CPC ........ G06F 3/0416; G06F 3/0412; G06F 3/14; G06F 1/3218; G09G 5/377; G09G 2330/021; G09G 2340/10; G09G 2360/127
See application file for complete search history.

(56) References Cited

U.S. PATENT DOCUMENTS

2005/0078093 A1   4/2005   Peterson, Jr. et al.
2005/0184978 A1*  8/2005   Bu ....................... G09G 3/3685
                                                                345/204
(Continued)

FOREIGN PATENT DOCUMENTS

KR   10-2006-0135628 A   12/2006
KR   10-2012-0083788 A    7/2012

*Primary Examiner* — Sahlu Okebato
(74) *Attorney, Agent, or Firm* — Innovation Counsel LLP (57) ABSTRACT

According to an embodiment, the display device includes a touch controller, an image processor, and a display driver. The touch controller is configured to output touch event information corresponding to a touch signal received from a touch panel. The image processor is configured to determine whether a host is in a sleep mode or a normal mode, and to output mixed image data obtained by overlapping an image displayed on a display panel and a marker corresponding to the touch event information while a host is in the sleep mode. The display driver is configured to output pixel driving signals corresponding to the mixed image data to the display panel. The touch controller or image processor is further configured to determine whether a touch input of a user to the touch panel meets a predetermined condition, and if the predetermined condition is met, output a wake-up signal to the host.

20 Claims, 4 Drawing Sheets (51) Int. Cl.
 *G06F 3/14* (2006.01)
 *G09G 5/02* (2006.01)
 *G06F 1/32* (2006.01)

(52) U.S. Cl.
 CPC .............. *G06F 3/0416* (2013.01); *G06F 3/14* (2013.01); *G09G 5/026* (2013.01); *G09G 2330/021* (2013.01); *G09G 2340/10* (2013.01); *G09G 2340/12* (2013.01); *G09G 2360/127* (2013.01); *G09G 2360/18* (2013.01); *Y02B 60/1242* (2013.01)

(56) References Cited

U.S. PATENT DOCUMENTS

| | | |
|---|---|---|
| 2013/0290761 A1 | 10/2013 | Moon et al. |
| 2015/0130764 A1* | 5/2015 | Woolley ................. G06F 3/044 345/174 |
| 2016/0062507 A1* | 3/2016 | Suzuki ................. G06F 3/0488 345/174 |

* cited by examiner

DISPLAY DEVICE, METHOD OF DRIVING THE SAME, AND IMAGE DISPLAY SYSTEM INCLUDING THE SAME

CROSS-REFERENCE TO RELATED APPLICATION

This application claims priority to and the benefit of Korean Patent Application No. 10-2014-0047630, filed on Apr. 21, 2014, in the Korean Intellectual Property Office, the entire contents of which are incorporated herein by reference in their entirety.

BACKGROUND

1. Field

The present system and method relate to a display device, a method of driving the same, and an image display system including the same.

2. Description of the Related Art

An image display system may include a display device and a host. Display devices, such as a Liquid Crystal Display (LCD), a Plasma Display Panel (PDP), and an Organic Light Emitting Display (OLED), have been variously implemented as a smart phone, a tablet PC, a notebook computer, a monitor, a television, and the like.

The display device generally includes a display driver and a display panel. The display driver receives input image data from the host and supplies pixel driving signals to a display panel based on the input image data. The display panel includes a plurality of pixels that display an image according to the pixel driving signals output from the display driver.

The host controls the display device by outputting the input image data to the display device. The host may also control other devices, such as sensors and communications devices. Accordingly, the host may consume a significant amount of power in the image display system.

SUMMARY

The present system and method provide a display device capable of reducing power consumption of a host, a method of driving the display device, and an image display system having the display device.

An exemplary embodiment of the present system and method provides a display device, including: a touch controller configured to output touch event information corresponding to a touch signal received from a touch panel; an image processor configured to: determine whether a host is in a sleep mode or a normal mode, and output mixed image data obtained by overlapping an image displayed on a display panel and a marker corresponding to the touch event information while a host is in the sleep mode; and a display driver configured to output pixel driving signals corresponding to the mixed image data to the display panel, wherein the touch controller or image processor is further configured to determine whether a touch input of a user to the touch panel meets a predetermined condition, and if the predetermined condition is met, output a wake-up signal to the host.

The image processor may be further configured to output input image data received from the host to the display driver while the host is in the normal mode.

The image processor may be further configured to store input image data output from the host when the host transitions from the normal mode to the sleep mode.

The image processor may be further configured to replace stored image data with the mixed image data while the host is in the sleep mode.

The image processor may be further configured to output the mixed image data to the host if the predetermined condition is met.

The image processor may be further configured to periodically output the mixed image data to the host while the host is in the sleep mode.

The image processor may be further configured to output the mixed image data to the host when the host transitions from the sleep mode to the normal mode.

The image processor may include: an image storing unit configured to store input image data output from the host as stored image data while the host is in the normal mode, store the mixed image data as stored image data while the host is in the sleep mode, and output the stored image data; an image mixer configured to generate the mixed image data by overlapping an image corresponding to the stored image data and the marker corresponding to the touch event information; and a wake-up controller configured to output the wake-up signal when the marker corresponds to a predetermined pattern based on the mixed image data output from the image mixer.

The wake-up controller may be further configured to output the mixed image data to the host when the marker corresponds to the predetermined pattern.

The image storing unit may include: a first multiplexer configured to output one of the input image data and the mixed image data according to a mode control signal; a frame buffer configured to store an output of the first multiplexer as the stored image data; and a second multiplexer configured to output one of the input image data and the mixed image data to the image mixer according to the mode control signal.

The image processor may include: an image storing unit configured to store input image data output from the host as stored image data while the host is in a normal mode, store the mixed image data as stored image data while the host is in the sleep mode, and output the stored image data; an image mixer configured to generate the mixed image data by overlapping an image corresponding to the stored image data and the marker corresponding to the touch event information; and a wake-up controller configured to output the wake-up signal when coordinates of the touch input included in the touch event information are included in a range of a predetermined region.

Another exemplary embodiment of the present system and method provides a system for displaying an image, including: a host that transitions from a normal mode to a sleep mode when a specific program is executed, and is configured to output a mode control signal in the sleep mode; and a display device that is configured to: store input image data received from the host as stored image data when the display device starts receiving the mode control signal from the host, replace the stored image data with mixed image data while the display device receives the mode control signal, the mixed image data includes a marker corresponding to a touch signal output from a touch panel, determine whether the touch signal meets a predetermined condition, and output a wake-up signal to the host if the touch input meets a predetermined condition.

The display device may be further configured to output the mixed image data to the host if the touch input meets the predetermined condition.

The display device may include: a touch controller configured to output touch event information corresponding to the touch signal; an image processor configured to generate the mixed image data by overlapping the image data and a marker corresponding to the touch event information while the host is in the sleep mode, and output the wake-up signal to the host when the touch input meets the predetermined condition; and a display driver configured to output pixel driving signals corresponding to the mixed image data to the display panel.

The display device may include: a touch controller configured to output touch event information corresponding to the touch signal, and output the wake-up signal to the host when the touch input meets the predetermined condition; an image processor configured to generate the mixed image data by overlapping the image data and a marker corresponding to the touch event information while the host is in the sleep mode, and output the mixed image data to the host in response to the wake-up signal; and a display driver configured to output pixel driving signals corresponding to the mixed image data to a display panel.

Yet another exemplary embodiment of the present system and method provides a method of driving a display device, including: storing input image data output from a host as stored image data when the display device starts receive a mode control signal the host; generating mixed image data by overlapping the stored image data and a marker corresponding to a touch input while the display device receives the mode control signal; displaying the mixed image data; replacing the stored image data with the mixed image data; and outputting a wake-up signal to the host when the touch input meets a predetermined condition.

The method may further include outputting the mixed image data to the host when the touch input meets the predetermined condition.

The method may further include outputting the mixed image data to the host when the display device stops receiving the mode control signal output from the host.

The method may further include periodically outputting the mixed image data to the host while the display device receives the mode control signal from the host.

The method may further include displaying the input image data while the mode control signal is not received from the host.

According to the exemplary embodiments of the present system and method, the display device, the method of driving the same, and the image display system including the same have an effect of reducing power consumption of the host.

BRIEF DESCRIPTION OF THE DRAWINGS

Example embodiments are described hereinafter with reference to the accompanying drawings. The present system and method, however, should not be construed as being limited to these embodiments. Rather, these embodiments are provided to facilitate the understanding of the present system and method by those of ordinary skill in the art.

In the drawings, the dimensions of the figures may be exaggerated for clarity. It is understood that when an element is referred to as being "between" two elements, it may be the only element between the two elements, or one or more intervening elements may also be present. Like reference numerals refer to like elements throughout.

DETAILED DESCRIPTION

Hereinafter, exemplary embodiments of the present system and method are described with reference to the accompanying drawings.

Figure 1:
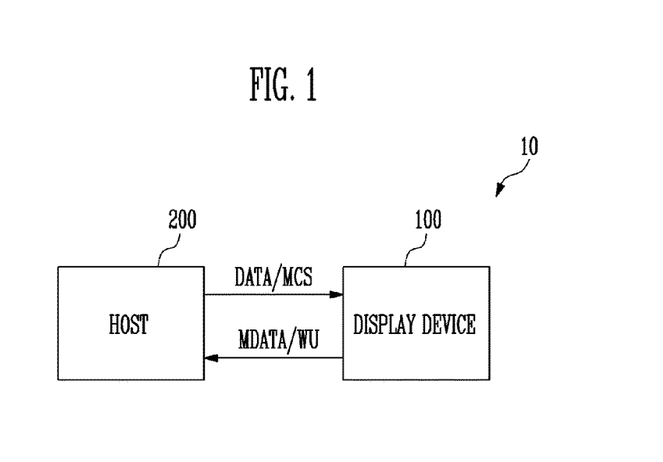
FIG. 1 is a block diagram illustrating an image display system according to an exemplary embodiment of the present system and method.

FIG. 1 is a block diagram illustrating an image display system according to an exemplary embodiment of the present system and method. Referring to FIG. 1, an image display system 10 includes a display device 100 and a host 200. The display device 100 includes a display element, such as a display panel 110 (see FIG. 2), for displaying an image, and an input element, such as a touch panel 150 (see FIG. 2), for detecting a touch input of a user.

While the host 200 is in a normal mode, the display device 100 displays an image that corresponds to input image data DATA output from the host 200. While the host 200 is in a sleep mode, the display device 100 displays an image obtained by overlapping an image that corresponds to the input image data DATA and a marker that corresponds to a touch input of a user.

As used herein, the "normal mode" refers to a state in which the host 200 is capable of operating at its full capacity. The "sleep mode," on the other hand, refers to a state in which the host 200 is limited in its operational capacity so that power consumption by the host 200 is less than when the host 200 is in the normal mode. That is, the host 200 may perform only basic functions sufficient to drive the image display system 10 while the host 200 is in the sleep mode. For example, the host 200 may not output the input image data DATA to the display device 100 in the sleep mode.

The display device 100 recognizes the state of the host 200 based on a mode control signal MCS output from the host 200. For example, the display device 100 may recognize that the host 200 is operating in the normal mode when the mode control signal MCS is not received from the host 200. Conversely, the display device 100 may recognize that the host 200 is operating in the sleep mode when the mode control signal MCS is received from the host 200.

Here, the mode control signal MCS may have a first level and a second level that correspond to different logic values. As an example, the output or the reception of the mode control signal MCS means that the mode control signal MCS has the first level, and the non-output or the non-reception of the mode control signal MCS means that the mode control signal MCS has the second level.

According to an embodiment, if the host 200 is in the sleep mode and the touch input of the user meets a predetermined condition, the display device 100 outputs a wake-up signal WU to the host 200. The predetermined condition may include the case in which the touch input of the user corresponds to a predetermined pattern and/or the touch input of the user is applied to a predetermined region.

In one case, the display device 100 may output mixed image data MDATA that correspond to a currently displayed image together with the wake-up signal WU to the host 200.

The display device 100 may periodically output the mixed image data MDATA to the host 200 while the host 200 is in the sleep mode. Further, when the host 200 transitions from the sleep mode to the normal mode regardless of the wake-up signal WU, the display device 100 may output the mixed image data MDATA to the host 200.

According to an embodiment, while in the normal mode, the host 200 outputs the input image data DATA to the display device 100. The host 200 does not output the mode control signal MCS in the normal mode. That is, the host 200 maintains the mode control signal MCS with the second level in the normal mode.

When the host 200 determines that it is not necessary to operate in the normal mode, the host 200 may transition from the normal mode to the sleep mode. For example, when a specific program, such as a drawing program, is executed, the host 200 may transition from the normal mode to the sleep mode.

According to an embodiment, while in the sleep mode, the host 200 does not output the input image data DATA. The host 200 outputs the mode control signal MCS to the display device 100 in the sleep mode. That is, the host 200 maintains the mode control signal MCS with the first level in the sleep mode.

The host 200 may transition from the sleep mode to the normal mode in response to the wake-up signal WU output from the display device 100. For example, when the display device 100 outputs the mixed image data MDATA together with the wake-up signal WU, the host 200 may transition from the sleep mode to the normal mode and simultaneously analyze the mixed image data MDATA to perform an operation corresponding to the touch input of the user.

If the display device 100 periodically outputs the mixed image data MDATA, the host 200 may temporarily store the received mixed image data MDATA and transition from the sleep mode to the normal mode in response to the wake-up signal WU. The host 200 may also simultaneously analyze the stored mixed image data MDATA to perform an operation corresponding to the touch input of the user.

Figure 2:
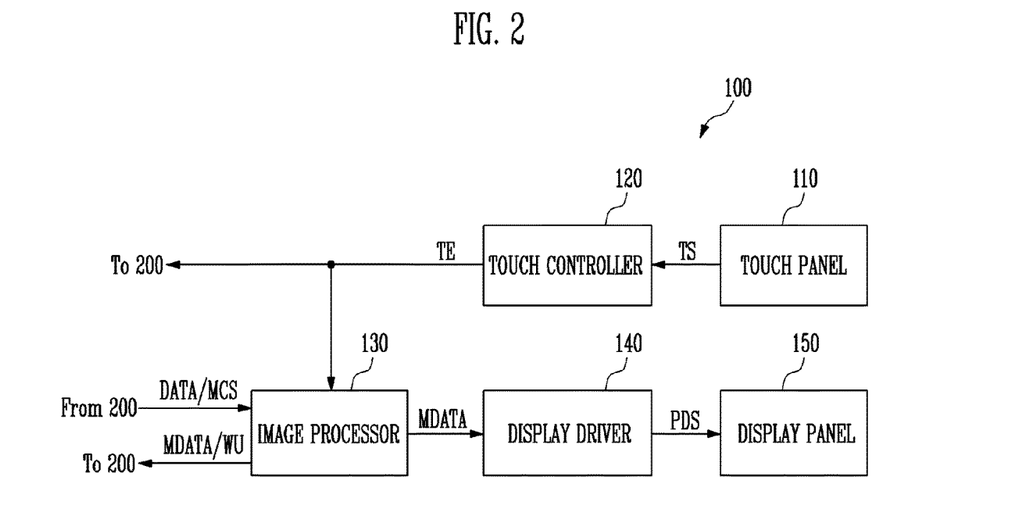
FIG. 2 is a block diagram illustrating an exemplary embodiment of a display device illustrated in FIG. 1.

FIG. 2 is a block diagram illustrating an exemplary embodiment of the display device illustrated in FIG. 1. Referring to FIG. 2, the display device 100 includes a touch panel 110, a touch controller 120, an image processor 130, a display driver 140, and a display panel 150.

The touch panel 110 detects a touch input of a user and outputs an electric signal, that is, a touch signal TS, corresponding to the touch input of the user. The touch panel 110 may be arranged on the display panel 150 or a function thereof may be included in the display panel 150. That is, although FIG. 2 illustrates that the touch panel 110 and the display panel 150 are separate elements, the present system and method are not limited thereto, and the touch panel 110 and the display panel 150 may be implemented as one element.

The touch controller 120 receives a touch signal TS output from the touch panel 110 and generates touch event information TE based on the touch signal TS. The touch event information TE may include coordinates, pressure, and/or a duration time of the touch input of the user. The touch controller 120 outputs the touch event information TE to the host 200 and the image processor 130.

According to an exemplary embodiment, when the host 200 is in the normal mode, the host 200 directly processes the touch event information TE. When the host 200 is in the sleep mode, the image processor 130 processes the touch event information TE.

According to another exemplary embodiment, even when the host 200 is in the normal mode, the image processor 130 may process the touch event information TE and output the processing result to the host 200.

According to another exemplary embodiment, when the host 200 is in the normal mode and the host 200 processes the touch event information TE, the image processor 130 may process recent touch event information TE, for example, within the several frames, without delay.

The image processor 130 receives the input image data DATA and the mode control signal MCS from the host 200, and receives the touch event information TE from the touch controller 120.

According to an exemplary embodiment, the image processor 130 may output the input image data DATA to the display driver 140 as is (e.g., not mixed with the touch event information) while the host 200 is in the normal mode, that is, the mode control signal MCS is not received from the host 200.

According to another exemplary embodiment, the image processor 130 may output the mixed image data MDATA to the display driver 140 while the mode control signal MCS is not received. The mixed image data MDATA may include the input image data DATA of an image that overlaps a marker corresponding to the touch event information TE within several frames. In such case, the display device 100 directly processes the recent touch input so that the touch input may be displayed on the display panel 150 without delay. The image processor 130 may also output the mixed image data MDATA to the display driver 140 while the host 200 is in the sleep mode, that is, the mode control signal MCS is received.

When the host 200 transitions from the normal mode to the sleep mode, that is, the host starts sending the mode control signal MCS, the image processor 130 stores the input image data DATA output from the host 200 as stored image data SDATA.

The image processor 130 stores the mixed image data MDATA as stored image data SDATA while the host 200 is in the sleep mode. Accordingly, the stored image data SDATA includes information about the touch input of the user during the period when the host 200 is in the sleep mode.

If the touch input of the user meets a predetermined condition while the host 200 is in the sleep mode, the image processor 130 outputs the wake-up signal WU to the host 200.

According to an exemplary embodiment, the image processor 130 determines whether the touch input of the user meets the predetermined condition based on the mixed image data MDATA. For example, the image processor 130 may extract from the mixed image data MDATA the marker that corresponds to the touch input of the user during the period when the host 200 is in the sleep mode. If the extracted marker corresponds to a predetermined pattern, the image processor 130 may output the wake-up signal WU to the host 200.

According to another exemplary embodiment, the image processor 130 determines whether the touch input of the user meets the predetermined condition based on the touch event information TE. For example, if the coordinates of the touch input included in the touch event information TE are within a range of a predetermined region, the image processor 130 may output the wake-up signal WU to the host 200.

The image processor 130 may output the mixed image data MDATA corresponding to a currently displayed image together with the wake-up signal WU to the host 200.

The image processor 130 may periodically output the mixed image data MDATA to the host 200 while the host 200 is in the sleep mode.

Further, when the host 200 transitions from the sleep mode to the normal mode, that is, the host stops sending the mode control signal MCS, the image processor 130 may output the mixed image data MDATA to the host 200.

As FIG. 2 illustrates, the display driver 140 receives the mixed image data MDATA or the input image data DATA from the image processor 130, and outputs a pixel driving signal PDS corresponding to the received data to the display panel 150.

The display driver 140 may include a timing controller (not shown) for synchronizing other constituent elements within the display driver 140, a data driver (not shown) for supplying data signals to pixels of the display panel 150, and a scan driver (not shown) for supplying scan signals to the pixels of the display panel 150.

The display driver 140 may be implemented as one integrated circuit, or a plurality of integrated circuits. That is, the timing controller, the data driver, and the scan driver may be implemented as separate integrated circuits. According to an embodiment, at least two of the timing controller, the data driver, and the scan driver may be implemented as one integrated circuit.

Although FIG. 2 illustrates that the touch controller 120, the image processor 130, and the display driver 140 are separate constituent elements, the technical spirit of the present system and method is not limited thereto. The touch controller 120, the image processor 130, and the display driver 140 may be implemented as one constituent element. In one case, the touch controller 120, the image processor 130, and the display driver 140 may be implemented as separate integrated circuits. In another case, at least two of the timing controller 120, the data driver 130, and the scan driver 140 may be implemented as one integrated circuit.

Figure 3:
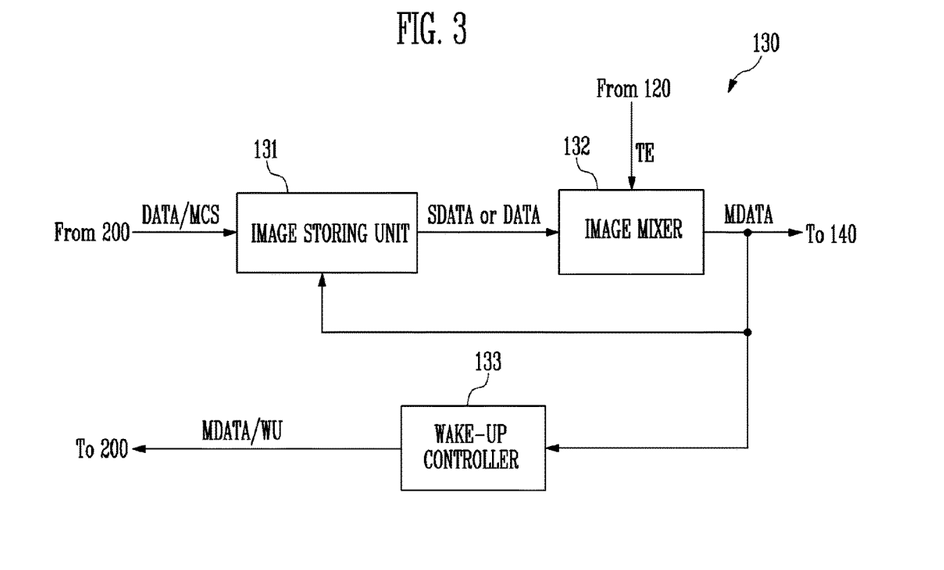
FIG. 3 is a block diagram illustrating an exemplary embodiment of an image processor illustrated in FIG. 2.

FIG. 3 is a block diagram illustrating an exemplary embodiment of the image processor illustrated in FIG. 2. Referring to FIG. 3, the image processor 130 includes an image storing unit 131, an image mixer 132, and a wake-up controller 133.

The image storing unit 131 stores the input image data DATA output from the host 200 as stored image data SDATA while the image mixer 132 is in the normal mode. The image storing unit 131 replaces the stored image data SDATA with the mixed image data MDATA from the input image data DATA while the host 200 is in the sleep mode. The image storing unit 131 outputs the stored image data SDATA to the image mixer 132.

The image mixer 132 receives the stored image data SDATA from the image storing unit 131, and receives the touch event information TE from the touch controller 120. The image mixer 132 overlaps an image corresponding to the stored image data SDATA and a marker corresponding to the touch event information TE, and generates mixed image data MDATA corresponding to the overlapping image. For example, the image mixer 132 may change a value corresponding to the coordinates of the touch input included in the touch event information TE in the stored image data SDATA to a predetermined value, and generate the changed data as the mixed image data MDATA. The image mixer 132 outputs the generated mixed image data MDATA to the image storing unit 131 and the wake-up controller 133.

The wake-up controller 133 receives the mixed image data MDATA from the image mixer 132. Based on the mixed image data MDATA, the wake-up controller 133 determines whether the touch input of the user for the period when the host 200 is in the sleep mode meets the predetermined condition, and outputs the wake-up signal WU to the host 200 according to a result of the determination (e.g., if the predetermined condition is met).

According to an exemplary embodiment, the wake-up controller 133 extracts the marker corresponding to the touch input of the user from the mixed image data MDATA to determine if the predetermined condition is met. If the extracted marker corresponds to a predetermined pattern, the wake-up controller 133 outputs the wake-up signal WU to the host 200. The wake-up controller 133 may output the mixed image data MDATA together with the wake-up signal WU.

Figure 4:
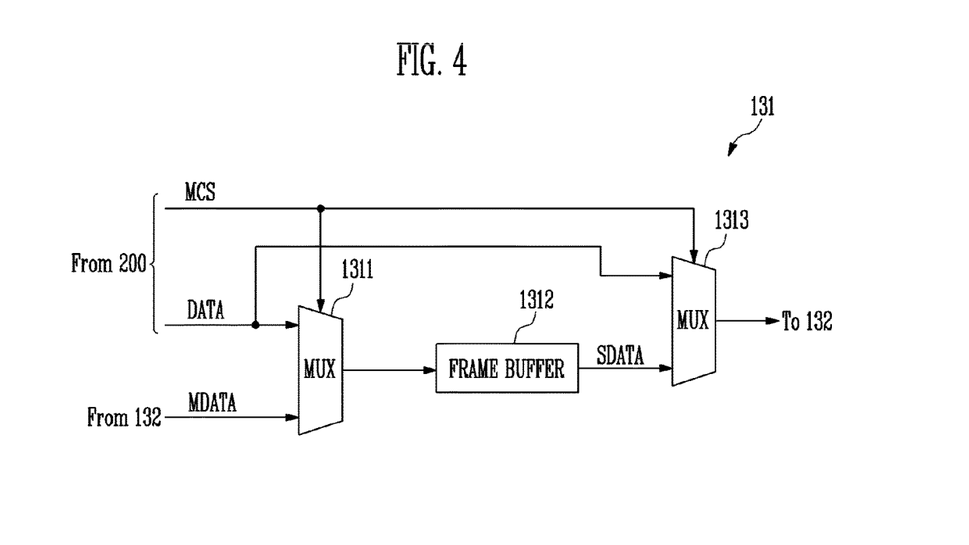
FIG. 4 is a block diagram illustrating an exemplary embodiment of an image storing unit illustrated in FIG. 3.

FIG. 4 is a block diagram illustrating an exemplary embodiment of the image storing unit illustrated in FIG. 3. Referring to FIG. 4, the image storing unit 131 includes a first multiplexer 1311, a frame buffer 1312, and a second multiplexer 1313.

The first multiplexer 1311 receives the input image data DATA from the host 200, and receives the mixed image data MDATA from the image mixer 132. The first multiplexer 1311 outputs one of the input image data DATA and the mixed image data MDATA to the frame buffer 1312 according to the mode control signal MCS output from the host 200.

For example, when the mode control signal MCS is received from the host 200, that is, the mode control signal MCS has the first level, the first multiplexer 1311 outputs the mixed image data MDATA to the frame buffer 1312. When the mode control signal MCS is not received from the host 200, that is, the mode control signal MCS has the second level, the first multiplexer 1311 outputs the input image data DATA to the frame buffer 1312.

The frame buffer 1312 stores the image data output, that is, the input image data DATA or the mixed image data MDATA, from the first multiplexer 1311 as the stored image data SDATA. The frame buffer 1312 outputs the stored image data SDATA to the second multiplexer 1313.

The second multiplexer 1313 receives the input image data DATA from the host 200, and receives the stored image data DATA from the frame buffer 1312. The second multiplexer 1313 outputs one of the input image data DATA and the stored image data SDATA to the image mixer 132 according to the mode control signal MCS output from the host 200.

For example, when the mode control signal MCS is received from the host 200, that is, the mode control signal MCS has the first level, the second multiplexer 1313 outputs the stored image data SDATA to the image mixer 132. When the mode control signal MCS is not received from the host 200, that is, the mode control signal MCS has the second level, the second multiplexer 1313 outputs the input image data DATA to the image mixer 132.

Figure 5:
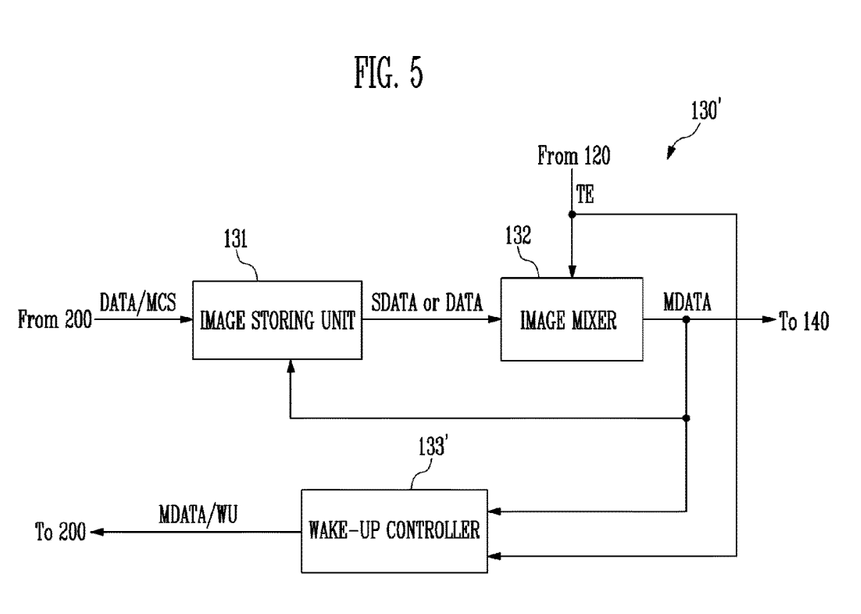
FIG. 5 is a block diagram illustrating another exemplary embodiment of an image processor illustrated in FIG. 2.

FIG. 5 is a block diagram illustrating another exemplary embodiment of an image processor illustrated in FIG. 2. The embodiment of FIG. 5 differs from that of FIG. 3 at least in that the wake-up controller 133' outputs the wake-up signal WU according to the touch event information TE output from the touch controller 120. Aspects that are substantially the same as those of FIG. 3 are not described to avoid redundancy.

Referring to FIG. 5, a wake-up controller 130' receives the touch event information TE from the touch controller 120. The wake-up controller 130' determines whether to output the wake-up signal WU based on the touch event information TE. For example, when the coordinates of the touch input included in the touch event information TE are included in a range of a predetermined region, the wake-up controller 130' outputs the wake-up signal WU to the host 200. The wake-up controller 130 may output the mixed image data MDATA together with the wake-up signal WU to the host 200.

Figure 6:
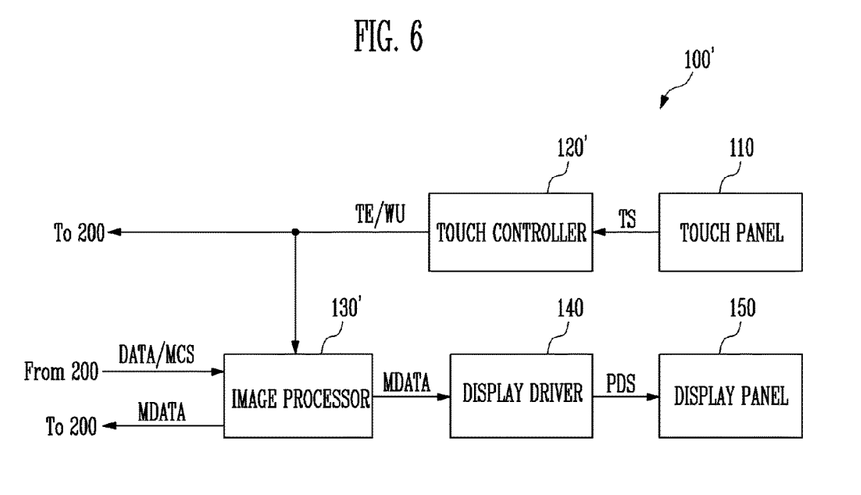
FIG. 6 is a block diagram illustrating another exemplary embodiment of a display device illustrated in FIG. 1.

FIG. 6 is a block diagram illustrating another exemplary embodiment of a display device illustrated in FIG. 1. The embodiment of FIG. 6 differs from that of FIG. 2 at least in that the touch controller 120', instead of the image processor 130', outputs the wake-up signal WU. Aspects that are substantially the same as those of FIG. 2 are not described to avoid redundancy Referring to FIG. 6, the touch controller 120' receives a touch signal TS output from the touch panel 110 and generates touch event information TE based on the touch signal TS. The touch controller 120' determines whether the generated touch event information TE meets the predetermined condition. That is, while the host 200 is operating in the sleep mode, if the touch input of the user meets a predetermined pattern, the touch controller 120' outputs the wake-up signal WU to the host 200 and the image processor 130'. To this end, the touch controller 120' may include a memory (not shown) for storing the coordinates of the touch input of the user during the period when the host 200 is operating in the sleep mode.

For example, if the touch controller 120' determines that the coordinates of the touch input of the user is within a range of a predetermined region, the touch controller 120' outputs the wake-up signal WU to the host 200 and the image processor 130'. The image processor 130' outputs the mixed image data MDATA corresponding to the image currently displayed on the display panel 150 in response to the wake-up signal WU output from the touch controller 120'.

Figure 7:
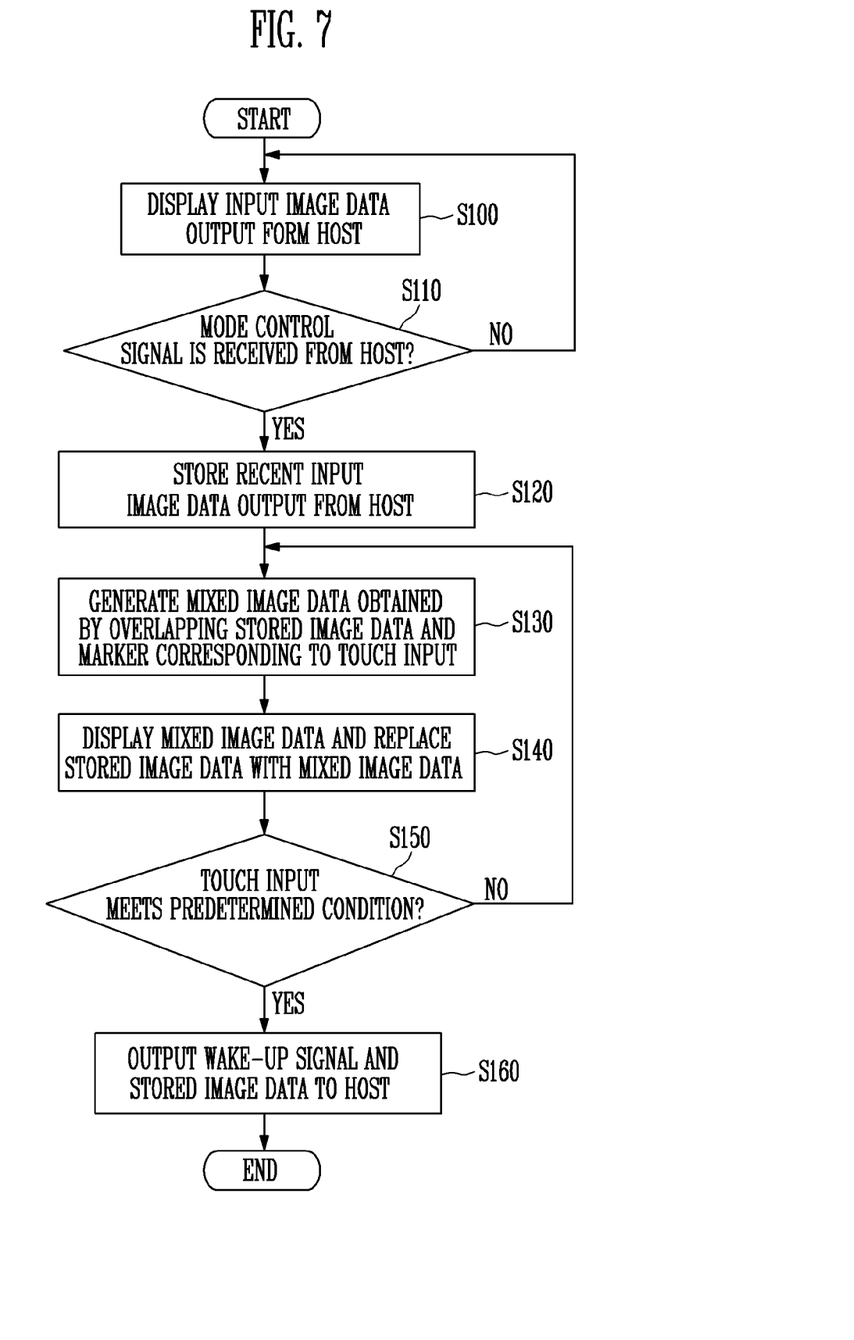
FIG. 7 is a flowchart illustrating a method of driving the display device according to an exemplary embodiment of the present system and method.

FIG. 7 is a flowchart illustrating a method of driving the display device according to an exemplary embodiment of the present system and method. Referring to FIG. 7, the display device 100 displays input image data DATA output from the host 200 while the host 200 is in the normal mode (S100).

The display device 100 displays the input image data DATA output from the host 200 until the mode control signal MCS is received from the host 200 ("No" in operation S110).

If the mode control signal MCS is received from the host 200 ("Yes" in operation S110), the display device 100 stores recent input image data DATA output from the host 200 as stored image data SDATA (S120).

According to an exemplary embodiment, the display device 100 may continuously update and store the input image data DATA output from the host 200. According to another exemplary embodiment, if the display device 100 starts to receive the mode control signal MCS, the display device 100 may store the input image data DATA output from the host 200.

The display device 100 generates mixed image data MDATA by overlapping an image corresponding to the stored image data SDATA and a marker corresponding to a touch input (S130). The display device 100 displays an image corresponding to the mixed image data MDATA and replaces the stored image data SDATA with the mixed image data MDATA (S140).

The display device 100 determines whether the touch input of the user meets a predetermined condition based on the mixed image data MDATA and/or touch event information TE (S150). If the touch input of the user does not meet the predetermined condition, the display device 100 repeats operations S130 to S140 ("No" in operation S150). If the touch input of the user meets the predetermined condition ("Yes" in operation S150), the display device 100 outputs the wake-up signal WU to the host 200. The display device 100 may output the mixed image data MDATA corresponding to the currently displayed image to the host 200.

Alhooungh example embodiments are disclosed herein, these embodiments should not be construed to be limiting. Those of ordinary skill in the art would recognize that various changes in form and details may be made without departing from the spirit and scope of the present system and method.

What is claimed is:

1. A display device, comprising:
    a touch controller configured to output touch event information corresponding to a touch signal received from a touch panel;
    an image processor configured to:
        determine whether a host is in a sleep mode or a normal mode, wherein the host processes touch event information in the normal mode and the host is in operational capacity in the sleep mode; and
        output mixed image data obtained by overlapping an image displayed on a display panel and a marker corresponding to the touch event information while the host is in a sleep mode; and
    a display driver configured to output pixel driving signals corresponding to the mixed image data to the display panel,
    wherein the touch controller or image processor is further configured to:
        determine whether a touch input of a user to the touch panel meets a predetermined condition, and
        if the predetermined condition is met, output a wake-up signal to the host wherein the wake-up signal causes the host to transition from the sleep mode to the normal mode.

2. The display device of claim 1, wherein the image processor is further configured to output input image data received from the host to the display driver while the host is in the normal mode.

3. The display device of claim 1, wherein the image processor is further configured to store input image data output from the host when the host transitions from the normal mode to the sleep mode.

4. The display device of claim 3, wherein the image processor is further configured to replace stored image data with the mixed image data while the host is in the sleep mode.

5. The display device of claim 4, wherein the image processor is further configured to output the mixed image data to the host if the predetermined condition is met.

6. The display device of claim 1, wherein the image processor is further configured to periodically output the mixed image data to the host while the host is in the sleep mode.

7. The display device of claim 1, wherein the image processor is further configured to output the mixed image data to the host when the host transitions from the sleep mode to the normal mode.

8. The display device of claim 1, wherein the image processor includes:
    an image storing unit configured to store input image data output from the host as stored image data while the host is in the normal mode, store the mixed image data as stored image data while the host is in the sleep mode, and output the stored image data;

an image mixer configured to generate the mixed image data by overlapping an image corresponding to the stored image data and the marker corresponding to the touch event information; and a wake-up controller configured to output the wake-up signal when the marker corresponds to a predetermined pattern based on the mixed image data output from the image mixer.

9. The display device of claim 8, wherein the wake-up controller is further configured to output the mixed image data to the host when the marker corresponds to the predetermined pattern.

10. The display device of claim 8, wherein the image storing unit includes:

a first multiplexer configured to output one of the input image data and the mixed image data according to a mode control signal;

a frame buffer configured to store an output of the first multiplexer as the stored image data; and a second multiplexer configured to output one of the input image data and the mixed image data to the image mixer according to the mode control signal.

11. The display device of claim 1, wherein the image processor includes:

an image storing unit configured to store input image data output from the host as stored image data while the host is in the normal mode, store the mixed image data as stored image data while the host is in the sleep mode, and output the stored image data;

an image mixer configured to generate the mixed image data by overlapping an image corresponding to the stored image data and the marker corresponding to the touch event information; and a wake-up controller configured to output the wake-up signal when coordinates of the touch input included in the touch event information are included in a range of a predetermined region.

12. A system for displaying an image, comprising:

a host that transitions from a normal mode to a sleep mode when a specific program is executed, and is configured to output a mode control signal in the sleep mode, wherein the host processes touch event information in the normal mode and the host is in operational capacity in the sleep mode; and a display device that is configured to:

store input image data received from the host as stored image data when the display device starts receiving the mode control signal from the host, replace the stored image data with mixed image data while the display device receives the mode control signal, the mixed image data includes a marker corresponding to a touch signal output from a touch panel, determine whether the touch signal meets a predetermined condition, and output a wake-up signal to the host if the touch input meets a predetermined condition, wherein the wake-up signal causes the host to transition from the sleep mode to the normal mode.

13. The system of claim 12, wherein the display device is further configured to output the mixed image data to the host if the touch input meets the predetermined condition.

14. The system of claim 12, wherein the display device includes:

a touch controller configured to output touch event information corresponding to the touch signal;

an image processor configured to:

generate the mixed image data by overlapping the image data and a marker corresponding to the touch event information while the host is in the sleep mode, and output the wake-up signal to the host when the touch input meets the predetermined condition; and a display driver configured to output pixel driving signals corresponding to the mixed image data to the display panel.

15. The system of claim 12, wherein the display device includes:

a touch controller configured to:

output touch event information corresponding to the touch signal, and output the wake-up signal to the host when the touch input meets the predetermined condition;

an image processor configured to:

generate the mixed image data by overlapping the image data and a marker corresponding to the touch event information while the host is in the sleep mode, and output the mixed image data to the host in response to the wake-up signal; and a display driver configured to output pixel driving signals corresponding to the mixed image data to a display panel.

16. A method of driving a display device, comprising:

storing input image data output from a host as stored image data when the display device receives a mode control signal from the host;

generating mixed image data by overlapping the stored image data and a marker corresponding to a touch input while the display device receives the mode control signal;

displaying the mixed image data;

replacing the stored image data with the mixed image data; and outputting a wake-up signal to the host when the touch input meets a predetermined condition to transition the host from a sleep mode to a normal mode, wherein the host processes touch event information in the normal mode and the host is in operational capacity in the sleep mode.

17. The method of claim 16, further comprising:

outputting the mixed image data to the host when the touch input meets the predetermined condition.

18. The method of claim 16, further comprising:

outputting the mixed image data to the host when the display device stops receiving the mode control signal output from the host.

19. The method of claim 16, further comprising:

periodically outputting the mixed image data to the host while the display device receives the mode control signal from the host.

20. The method of claim 16, further comprising:

displaying the input image data while the mode control signal is not received from the host.

* * * * *